United States Patent
Patton et al.

(10) Patent No.: US 7,937,838 B2
(45) Date of Patent: May 10, 2011

(54) HYDRAULIC RESCUE TOOL WITH QUICK-CHANGE HEAD

(76) Inventors: Tommy L. Patton, Upland, CA (US);
Edward H. Hagbloom, Upland, CA (US)

( * ) Notice: Subject to any disclaimer, the term of this patent is extended or adjusted under 35 U.S.C. 154(b) by 0 days.

(21) Appl. No.: 12/806,433

(22) Filed: Aug. 12, 2010

(65) Prior Publication Data
US 2010/0307010 A1 Dec. 9, 2010

(51) Int. Cl.
*B25F 1/00* (2006.01)
*B26B 15/00* (2006.01)
(52) U.S. Cl. ............................................ 30/134; 30/228
(58) Field of Classification Search ............... 30/134, 30/228, 251, 252, 260, 266; 72/392, 453.15, 72/453.16, 464, 705
See application file for complete search history.

(56) References Cited

U.S. PATENT DOCUMENTS

| | | | |
|---|---|---|---|
| 2,447,401 A | 8/1948 | Ferguson et al. | |
| 3,570,835 A | 3/1971 | McPherson | |
| 3,819,153 A | 6/1974 | Hurst et al. | |
| 4,234,990 A * | 11/1980 | Colburn | 441/75 |
| 4,333,330 A | 6/1982 | Porter | |
| 4,392,263 A | 7/1983 | Amoroso | |
| 4,506,445 A | 3/1985 | Esten | |
| 4,531,289 A * | 7/1985 | Brick | 30/134 |
| 4,734,983 A | 4/1988 | Brick | |
| 4,842,249 A * | 6/1989 | Weigand | 254/93 R |
| 4,886,635 A | 12/1989 | Forster et al. | |
| 4,896,862 A * | 1/1990 | Ganley | 254/1 |
| 5,243,761 A * | 9/1993 | Sullivan et al. | 30/134 |
| 5,301,533 A | 4/1994 | Jackson | |
| 5,425,260 A | 6/1995 | Gehron | |
| 5,544,862 A | 8/1996 | Hickerson | |
| 5,622,353 A | 4/1997 | Painter et al. | |
| 5,956,992 A | 9/1999 | Patton | |
| 6,244,568 B1 | 6/2001 | Patton | |
| 7,107,812 B1 * | 9/2006 | Patton et al. | 72/392 |
| 7,568,372 B1 * | 8/2009 | Patton et al. | 72/464 |
| 2005/0063177 A1 * | 3/2005 | Correa | 362/109 |

* cited by examiner

*Primary Examiner* — Hwei-Siu C Payer
(74) *Attorney, Agent, or Firm* — Albert O. Cota

(57) ABSTRACT

A hydraulic rescue tool (10) with a quick-change head (26) that incorporates a cylinder (20) having a piston rod (22) and a forward end structure (24). The forward end structure (24) has a separable head and a cylinder attaching bifurcated yoke (28). A pair of yoke quick release pins (48) jointly engage the head (26) and the bifurcated yoke (28) thus, creating an attachment therebetween. A pair of cutting blades (50) are connected to the head (26), and links (54) connect to the piston rod on a first end and to the cutting blades (50) on a second end, thereby forcing the cutting blades from an open position to a closed position by movement of the piston rod (22). A pair of link quick release pins (60) engage the links (54), creating an attachment therebetween, permitting the links to be released by manually disengaging the quick release pins, thereby allowing the head, including the cutting blades, to be rapidly removed or repaired.

18 Claims, 4 Drawing Sheets

HYDRAULIC RESCUE TOOL WITH QUICK-CHANGE HEAD

TECHNICAL FIELD

The invention generally pertains to hydraulic rescue tools, and more particularly to a detachable head for a rescue tool that includes cutting blades allowing the head to be rapidly removed and replaced with the same or alternative types of blades or to easily repair the existing blades.

BACKGROUND ART

For any person who works in an occupation that is responsible for rescuing and/or saving victims of accidents, their tools are often the only means by which to actually save a person's life. One of the most effective and widely used tools for rescuing a person is the "Jaws of Life"® type device. This device, of which there are several different design configurations, and can be powered by different means as well, are used to free a trapped and often injured victim from within an enclosed space. A frequent scenario which necessitates the "Jaws of Life"® is when a passenger in a vehicle is trapped within a crushed and mangled section of the vehicle after an accident. As a result of some accidents, especially those that occur at high speeds or between disproportionately sized vehicles, one or more of the vehicles involved may sustain such severe damage that the metal becomes deformed, thus creating extremely difficult removal of the passenger(s) within.

In the past, rescuers had to attempt to pry the metal apart with a crowbar, or similar tool, or they would be forced to saw the metal open. Another method that was used in the past was a high-temperature torch to cut through the metal. Unfortunately, if there was any gasoline or other flammable liquid spilled or in the atmosphere, the probability for an explosion to occur as a result of this was very high. Regardless of whichever of these methods was employed they all shared one major drawback; the amount of time required to use and successfully finish with these tools was often so long that the victim or victims within the vehicle(s) sometimes suffered more injuries or even death due to the length of time they were trapped.

Another major drawback of current rescue devices is that in order to provide the necessary force which is usually between 70,000 and 150,000 pounds, the device must have a high-level power source. This need directly effects the portability and ease-of-use characteristics of the device. It is clearly obvious that there is a need for a high-power, portable rescue device that is capable of being used by a single operator and that can be easily transported to the scene of an accident. Additionally, rescue tools in current production do not provide a method for quickly removing and replacing the cutting blades required to handle various and specialized rescue tasks.

A search of the prior art did not disclose literature or patents that read directly on the claims of the instant invention. However, the following U.S. patents are considered related.

| PATENT NO. | INVENTOR | ISSUED |
| --- | --- | --- |
| 3,819,153 | Hurst, et al | 25 Jun. 1974 |
| 4,333,330 | Porter | 8 Jun. 1982 |
| 4,392,263 | Amoroso | 12 Jul. 1983 |
| 4,506,445 | Esten | 26 Mar. 1985 |
| 4,734,983 | Brick | 5 Apr. 1988 |
| 5,301,533 | Jackson | 12 Apr. 1994 |
| 5,544,862 | Hickerson | 13 Aug. 1996 |
| 5,622,353 | Painter et al | 22 Apr. 1997 |
| 5,956,992 | Patton | 28 Sep. 1999 |
| 6,244,568 | Patton | 12 Jun. 2001 |
| 7,107,812 | Patton | 19 Sep. 2006 |

Hurst in U.S. Pat. No. 3,819,153 teaches a portable rescue tool that uses a fluid actuated force that is movable along the longitudinal axis of a base for positioning a pair of arms. The arms move their outer ends toward and way from each other to open and close.

U.S. Pat. No. 4,333,330 issued to Porter for a spreader tool that has opposed force arms which are separated and pivoted while mounted on a base member. When separated and pivoted, the arms achieve annular movement in an opposite direction in response to an axial movement of a driven piston of an associated jack. The inner edges of the arms rest upon rollers mounted on the forward end of the piston. A curve of the inner edge of the arms form an angle at which a constant axial force of the piston is applied to the arm by the roller such that the force remains constant.

Amoroso in U.S. Pat. No. 4,392,263 teaches a rescue tool including a body with a cylinder and an outward-extending piston. Jaw members are connected to the body with links and include outer prying portions, inner cutting portions and intermediate shearing portions. The tool may be powered by a bi-directional motor or directly from a motor located on a vehicle wrecking trucks.

U.S. Pat. No. 4,506,445 of Esten discloses a rescue cutter tool having a body with a fluid cylinder including a forward end structure having a pair of cutting blades attached thereto. Linking means are asymmetrically secured to the cutting blades and interconnected to a fluid actuated force. The cutting blades pivot between non-cutting open and closed cutting positions. Handles are provided for manipulating and supporting the tool.

U.S. Pat. No. No. 4,734,983 issued to Brick teaches a cutting tool that is effective for cutting through sheet metal when extricating accident victims. The tool has one curved movable blade and one stationary blade. The stationary blade is formed on an anvil that is anchored within the frame of the tool and locked within the frame with a dowel U.S. Pat. No. No. 5,301,533 of Jackson discloses a machine tool that relates to manufacturing operations for gripping, clamping, piercing and hemming workpieces. Two pairs of arms are arranged in an opposed, inverted relationship with respect to each other and are pivotally connected at one end of a drive. Each arm has a cam formed therein. The cams in each of the pairs of arms are identically constructed in an opposed inverted relationship. Cam followers, which are mounted on the linear drive member, engage the cams during movement to pivot the arms between the open and closed position. Each cam has an arcuate shape at an obtuse angle with respect to a pivot pin that connects each of the pairs of arms the drive.

U.S. Pat. No. 5,544,862 of Hickerson is for a spreading tool that is actuated by an electric motor. Torque at any position is achieved with selectable spreading or cutting motions using a rotary multiple stage speed-reducing gearbox, which is driven by a motor running on a 12-volt DC power supply.

Painter et al in U.S. Pat. No. 5,622,353 discloses a rescue tool having a pair of spreader arms with a pivot point therebetween. A pair of links attached to the arms are reciprocally moveable between a retracted and an extended positions along an axis of movement. A pivotal coupling couples the spreader arm pivot point to the housing.

U.S. Pat. No. 5,956,992 issued to Patton, the inventor of the instant application, is for a rescue tool consisting of a first arm that functions in combination with an interlocking second arm, which operates with a drive yoke. Another yoke includes a pair of cam pins that traverse a cam slot in each arm and a drive rod is connected to the drive yoke.

U.S. Pat. No. 7,107,812 also issued to Patton discloses a hydraulic rescue tool utilizing a hydraulic cylinder with a yoke attached that includes a handle for manipulating the tool. Rotation of the hydraulic cylinder yoke prevents injury if the tool inadvertently binds. Pivotal links connect the implement unit with quick release pins, thus making the implement unit easily removable. Two embodiments of the implement unit are taught, with a cutter unit for severing material and a spreader unit for prying apart structural elements of a vehicle.

For background purposes and as indicative of the art to which the invention is related, reference may be made to the remaining patents located in the patent search.

| PATENT NO. | INVENTOR | ISSUED |
| --- | --- | --- |
| 2,447,401 | Ferguson, et al | 17 Aug. 1948 |
| 3,570,835 | McPherson | 16 Mar. 1971 |
| 4,886,635 | Forster, et al | 12 Dec. 1998 |
| 5,425,260 | Gehron | 20 Jun. 1995 |

DISCLOSURE OF THE INVENTION

A number of hydraulic rescue tools are in the market today which provide aid to accident victims who are trapped in vehicle wreckage and must have the physical structure of the vehicle removed in order to free the person. As well as cutting apart vehicles, these tools can also be utilized to cut chain link fences, security fences, sheet metal barriers and other obstacles which must be removed in critical situations. Common rescue tools basically function in their given task but most tools require maintenance and repair which can only be accomplished in a well equipped facility. If a blade is broken or some other major malfunction occurs in the field, the emergency personnel must disconnect the tool and quickly find a replacement blade, which may not always be available.

Therefore the primary object of the invention is to provide a rescue tool that incorporates a quick-change head, thereby permitting the tools hydraulic cylinder to remain attached to the power source and only the portion having the operable cutting blades removed. Incorporating a separable head within the body of the hydraulic cylinder makes the removal of the blade easy by simply disconnecting quick release pins and sliding two of the main structural members apart. By having other specialized heads with blades such as spreaders or specific purpose implements, the rescue personnel has greater flexibility while still using the same basic tool.

An important object of the invention is that a spare head with the cutting blades attached may be stored with the rescue tool, thus making the change rapid and easily accomplished.

Another object of the invention is that the quick release pins are tethered to either the cylinder body or the head, which prevents loss and provides a rapid change without fumbling or misplacing the pin in an emergency situation.

Still another object of the invention is that the cost of a spare or specialized removable head is considerably less than an entire standby tool.

Yet another object of the invention permits only the head to be taken to a repair facility for rework or replacement of parts if only that part malfunctions.

A final object is that the invention is cost effective from both a manufacturer's and customer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
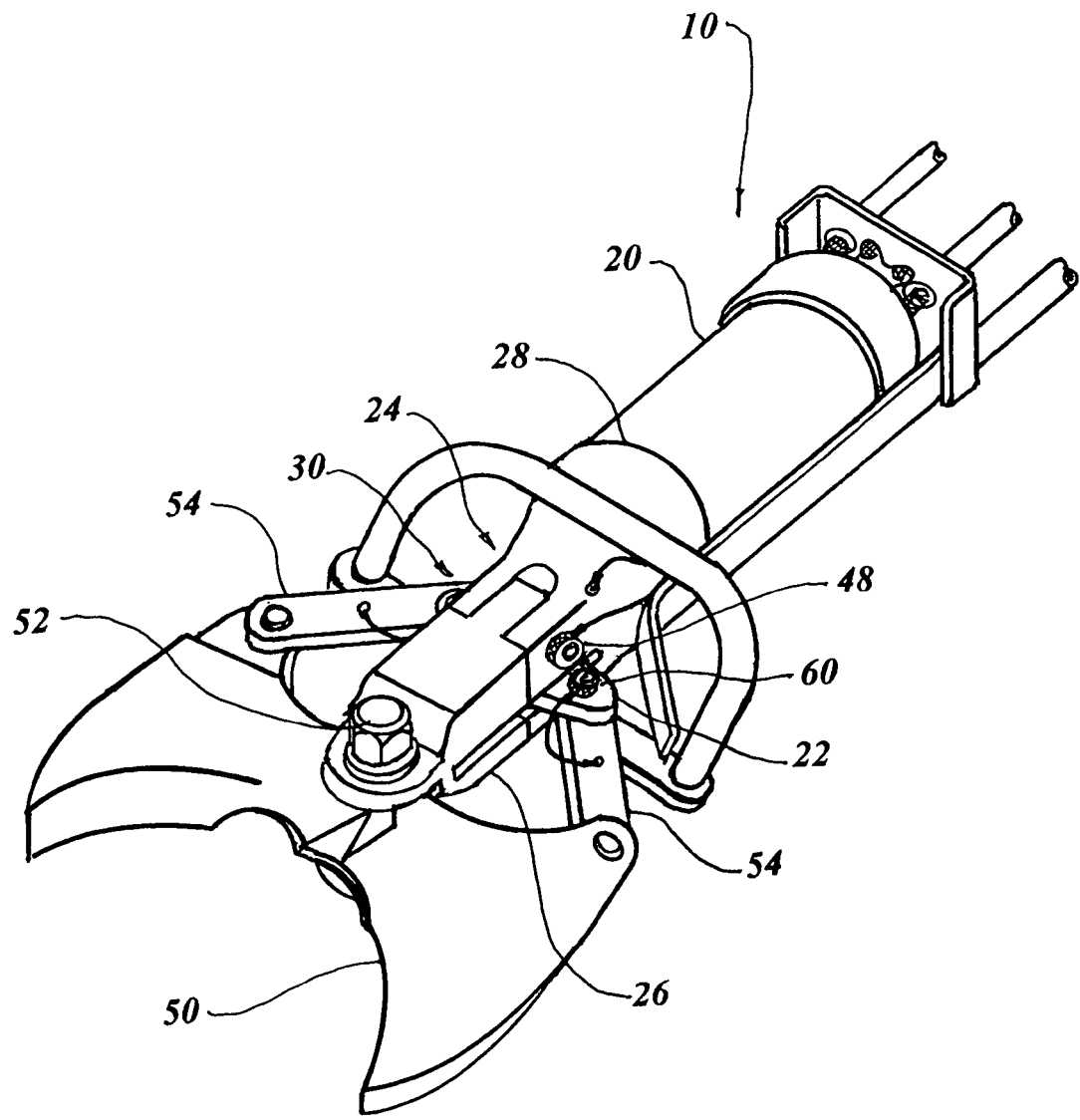
FIG. 1 is a partial isometric view of the preferred embodiment of the hydraulic rescue tool having a quick-change head.
Figure 2:
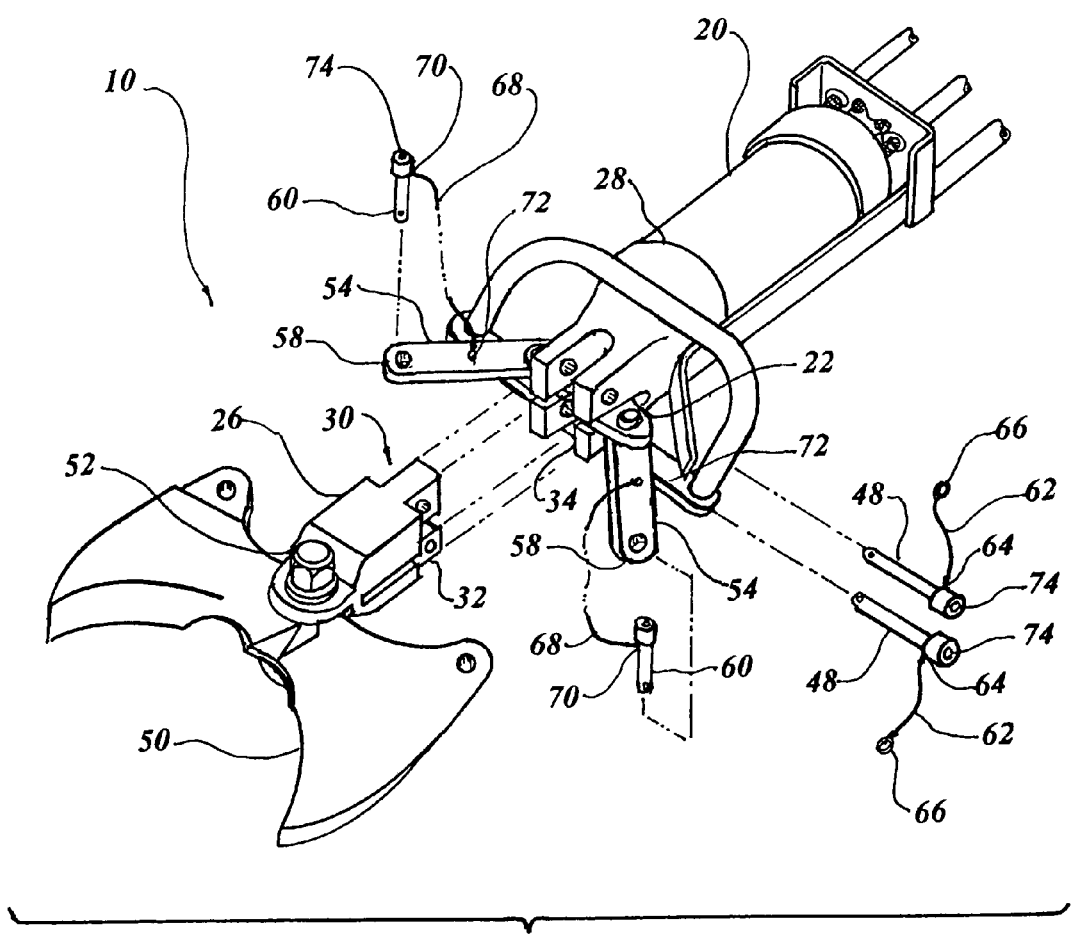
FIG. 2 is a partial isometric exploded view of the hydraulic rescue tool with the quick-change head removed and a set of links removed from the cutting blades.
Figure 3:
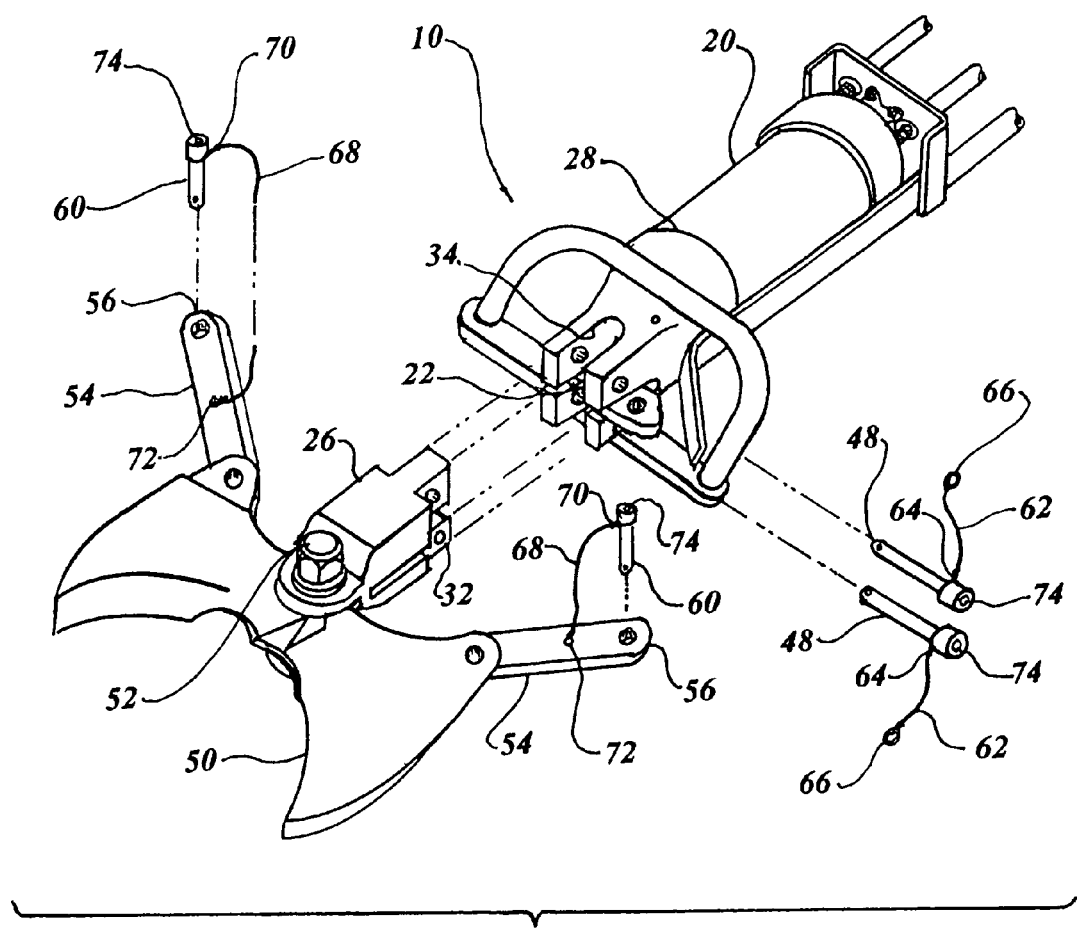
FIG. 3 is a partial isometric exploded view of the hydraulic rescue tool with the quick-change head removed and the links removed from a cylinder piston rod.

The best mode for carrying out the invention is presented in terms of a preferred embodiment of a hydraulic rescue tool that features a quick-change head 10. The preferred embodiment, as shown in FIGS. 1 through 9, is comprised of a cylinder 20 having a piston rod 22 and a forward end structure 24. The forward end structure 24 has a separable head 26 and a cylinder attaching bifurcated yoke 28, as illustrated in FIGS. 1 through 3.

Figures 4, 5:
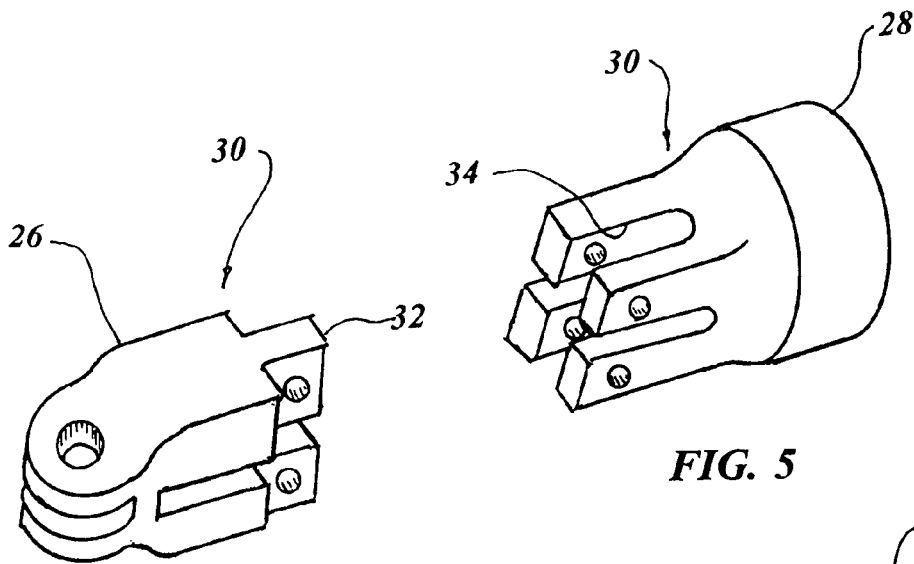
FIG. 4 is a partial isometric view of the head in a tongue and groove configuration, with the tongue portion in the head for detachment with a bifurcated yoke.
FIG. 5 is a partial isometric view of the bifurcated yoke in the tongue and groove configuration, with the groove portion in the bifurcated yoke for detachment with the head.
Figures 6, 7:
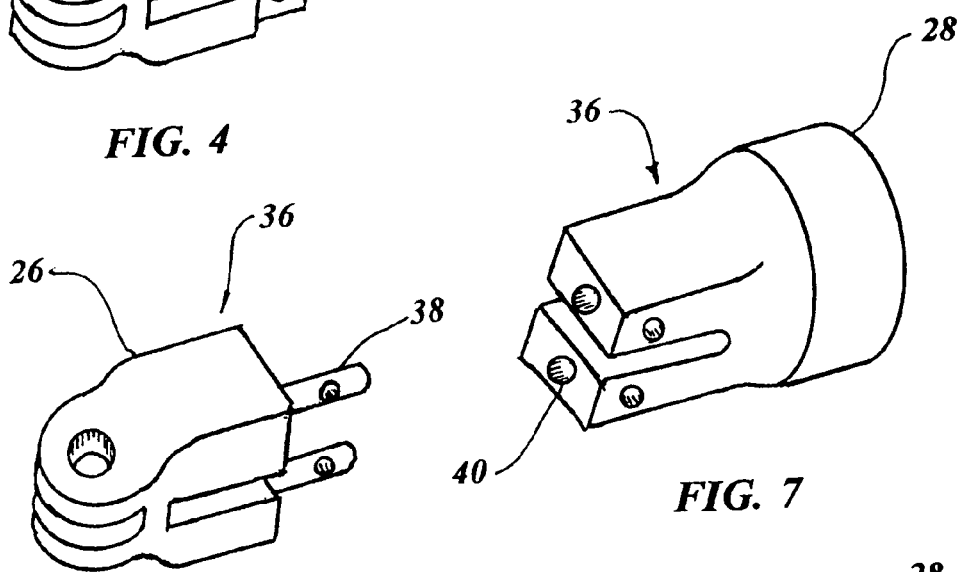
FIG. 6 is a partial isometric view of the head in a pin and socket configuration, with the pins in the head for detachment with the bifurcated yoke.
FIG. 7 is a partial isometric view of the bifurcated yoke in the pin and socket configuration, with the sockets in the bifurcated yoke for detachment with the head.
Figures 8, 9:
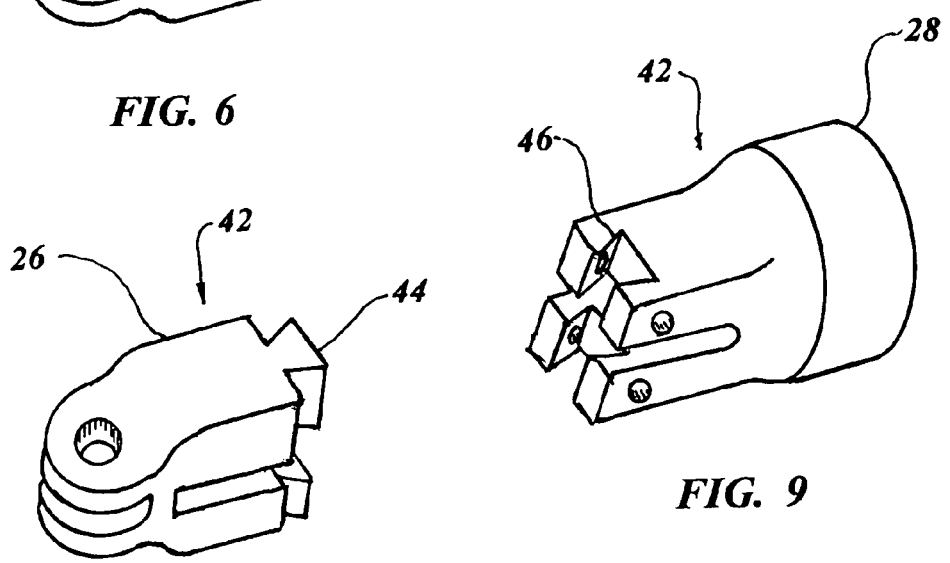
FIG. 8 is a partial isometric view of the head in the dovetail configuration, with the pin portion in the head for detachment with the bifurcated yoke.
FIG. 9 is a partial isometric view of the bifurcated yoke in the dovetail configuration, with the tail portion in the bifurcated yoke for detachment with the head.

The head 26 and yoke 28 can be easily and quickly disconnected by utilizing any of the following alternatives: a tongue and groove 30, as shown in FIGS. 4 and 5, with the tongue 32 in FIG. 4 and the groove 34 in FIG. 5; a pin and socket 36 depicted in FIGS. 6 and 7, with the pin 38 in FIG. 6 and the socket 40 in FIG. 7; or a dovetail 42 as illustrated in FIGS. 8 and 9, with an attachment pin 44, as shown in FIG. 8 and a tail 46, as shown in FIG. 9. However, the method of separating the head 26 from the yoke 28 is not limited to any one of the three configurations described above and illustrated in the drawings. All practical methods and approaches of separation have been anticipated and may be used with equal ease and utility, therefore fall within the scope of the claims.

At least one, and preferably two, yoke quick release pins 48 jointly engage the head 26 and the bifurcated yoke 28, thus creating an attachment therebetween, as shown in FIGS. 1 through 3.

A pair of cutting blades 50 are connected with a fixed pivot axle 52 to the head 26 of the forward end structure 24. The cutting blades 50 are selected from a pair of spreader arms, a pair of cutting jaws, a two-stage mechanical structure, a pipe and structural head, a guillotine head, a reverse-cutting guillotine head, or a cam-operated cutter, all of which are specified and claimed in U.S. application Ser. No. 12/152,004 filed May 13, 2008 entitled "Hydraulic Rescue Tool", now U.S. Pat. No. 7,568,372, which is incorporated herein by reference.

Links 54, in pairs, are individually connected to the piston rod 22 on a first end 56 and to the cutting blades 50 on a second end 58, thereby forcing the cutting blades 50 from an open position to a closed position by movement of the piston rod 22. The links 54 are illustrated in FIGS. 1 through 3, however, the links 54 may be any configuration provided they form a pin 60 that engages the links 54 at an interface with the cutting blades 50 as depicted in FIG. 2.

Each yoke quick release pin 48 may include a tether 62 that is attached on the pin's first end 64 and to the bifurcated yoke 28 on a second end 66. The yoke quick release pin 48 may include a self-contained circuit incorporating a light emitting diode (LED) 74 within a head portion. Each link quick release pin 60 may include a tether 68 attached to the pin 60 on a first end 70 and to the link 54 on a second end 72. The yoke quick release pin 48 may also incorporate a self-contained LED 74 within a head portion. The tethers 62 and 68, as well as the LED 74, are illustrated in FIGS. 1 through 3.

To remove the head 26 from the bifurcated yoke 28, the links 54 are released by manually disengaging the link quick release pins 60 and then the yoke quick release pins 48, thereby allowing the head 26, including the cutting blades 50, to be rapidly removed or repaired as required. It is also possible to retrofit existing rescue tools by removing a forward end structure 24 and replacing the structure with a separable head 26 and yoke 28, along with replacing or reworking the links 54 to receive link quick release pins 60.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A hydraulic rescue tool with a quick-change head comprising:
   a) a cylinder having a piston rod and a forward end structure, with the forward end structure comprising a separable head and a cylinder attaching bifurcated yoke,
   b) at least one yoke quick release pin jointly engaging the separable head and the bifurcated yoke, thus creating a secure attachment therebetween until manually freed,
   c) a pair of cutting blades that are connected with a fixed pivot axle to the separable head of the forward end structure,
   d) a pair of links that are connected to the piston rod on a first end and to the cutting blades on a second end, thereby forcing the cutting blades from an open position to a closed position by movement of the piston rod, and
   e) a pair of link quick release pins engaging said pair of links, creating an attachment therebetween, permitting the links to be released by manually disengaging the link quick release pins and the separable head to be detached by manually disengaging the at least one yoke quick release pin, thereby allowing the separable head, including the cutting blades, to be rapidly removed or repaired.

2. The hydraulic rescue tool with a quick-change head as recited in claim 1 wherein said separable head and said cylinder attaching bifurcated yoke are separated with means for disconnecting that is selected from the group consisting of a tongue and groove, a pin and socket and a dovetail.

3. The hydraulic rescue tool with a quick-change head as recited in claim 1 wherein said cutting blades are selected from the group consisting of a pair of spreader arms, a pair of cutting jaws, a two-stage mechanical structure, a pipe and structural head, a guillotine head, a reverse-cutting guillotine head, and a cam-operated cutter.

4. The hydraulic rescue tool with a quick-change head as recited in claim 1 wherein said pair of link quick release pins engage said pair of links at an interface with the piston rod.

5. The hydraulic rescue tool with a quick-change head as recited in claim 1 wherein said pair of link quick release pins engage said pair of links at an interface with the cutting blades.

6. The hydraulic rescue tool with a quick-change head as recited in claim 1 wherein said at least one yoke quick release pin further comprises a tether attached to the at least one yoke quick release pin on a first end and to the bifurcated yoke on a second end.

7. The hydraulic rescue tool with a quick-change head as recited in claim 1 wherein said at least one yoke quick release pin further comprises a self-contained circuit incorporating a light emitting diode (LED) that is located within a head portion thereof.

8. The hydraulic rescue tool with a quick-change head as recited in claim 1 wherein said pair of link quick release pins further comprise a tether attached to each of the pair of link quick release pins on a first end and to each of the pair of links on a second end.

9. The hydraulic rescue tool with a quick-change head as recited in claim 1 wherein said pair of link quick release pins further comprise a self-contained LED within a head portion thereof.

10. An improved rescue cutting tool of the type having a body that includes a cylinder with a piston rod and a forward end structure, a pair of cutting blades connected to the forward end structure of said body, a pair of links connected to the piston rod on a first end and connected to said cutting blades on a second end, thereby forcing the cutting blades from an open position to a closed position by movement of the piston rod, wherein said improvement comprises:
   a) said forward end structure detachable into two separate discrete elements consisting of a head and a bifurcated yoke, with the head attached to said cutting blades and the bifurcated yoke attached to said cylinder,
   b) at least one yoke quick release pin engaging the head and the bifurcated yoke, thereby creating a secure attachment therebetween until manually freed, and
   c) a pair of link quick release pins engaging said pair of links, permitting the links to be released by manually pulling out the link quick release pins and the head to be detached by manually pulling out the at least one yoke quick release pin, thereby allowing the head, including the cutting blades, to be rapidly removed or repaired.

11. The improved hydraulic rescue tool as recited in claim 10 wherein said head and said bifurcated yoke are separated with means for disconnecting that is selected from the group consisting of a tongue and groove, a pin and socket and a dovetail.

12. The improved hydraulic rescue tool as recited in claim 10 wherein said cutting blades are selected from the group consisting of a pair of spreader arms, a pair of cutting jaws, a two-stage mechanical structure, a pipe and structural head, a guillotine head, a reverse-cutting guillotine head, and a cam-operated cutter.

13. The improved hydraulic rescue tool as recited in claim 10 wherein said pair of link quick release pins engage said pair of links at an interface with the cutting blades.

14. The improved hydraulic rescue tool as recited in claim 10 wherein said at least one yoke quick release pin further comprises a tether attached to the at least one yoke quick release pin on a first end and to the bifurcated yoke on a second end.

15. The improved hydraulic rescue tool as recited in claim 14 wherein said at least one yoke quick release pin further comprises a self-contained circuit that incorporates an LED within a head portion thereof.

16. The improved hydraulic rescue tool as recited in claim 10 wherein said pair of link quick release pins further comprise a tether attached to each of the pair of link quick release pins on a first end and to each of the pair of links on a second end.

17. The improved hydraulic rescue tool as recited in claim 16 wherein said pair of link quick release pins further comprises a self-contained circuit that incorporates an LED within a head portion thereof.

18. An improved rescue cutting tool of the type having a body that includes a cylinder with a piston rod and a forward end structure, a pair of cutting blades connected to the forward end structure of said body, a pair of links connected to the piston rod on a first end and connected to said cutting blades on a second end, thereby forcing the cutting blades from an open position to a closed position by movement of the piston rod, wherein said improvement comprises:
  a) said forward end structure detachable into two separate discrete elements consisting of a head and a bifurcated yoke, with the head attached to said cutting blades and the bifurcated yoke attached to said cylinder,
  b) at least one yoke quick release pin engaging the head and the bifurcated yoke, thereby creating a secure attachment therebetween until manually freed, and
  c) a pair of link quick release pins engaging said pair of links, permitting the links to be released by manually pulling out the link guick release pins and the head to be detached by manually pulling out the at least one yoke quick release pin, thereby allowing the head, including the cutting blades, to be rapidly removed or repaired, wherein said pair of link quick release pins engage said pair of links at an interface with the piston rod.

* * * * *